US005195014A

United States Patent [19]

Krantz, Jr. et al.

[11] Patent Number: 5,195,014

[45] Date of Patent: Mar. 16, 1993

[54] TRANSIENT SUPPRESSION COMPONENT

[75] Inventors: Leonard A. Krantz, Jr., Sidney; Gary C. Toombs, Oneonta; Douglas M. Johnescu, Gilbertsville, all of N.Y.

[73] Assignee: Amphenol Corporation, Wallingford, Conn.

[21] Appl. No.: 834,344

[22] Filed: Feb. 12, 1992

Related U.S. Application Data

[63] Continuation-in-part of Ser. No. 709,152, Jun. 3, 1991.

[51] Int. Cl.[5] .......... H02H 9/00; H01R 19/04

[52] U.S. Cl. .......... 361/111; 439/620

[58] Field of Search .......... 361/56, 111, 119; 439/620

[56] References Cited

U.S. PATENT DOCUMENTS 3,840,841 10/1974 Clark .......... 439/620

4,772,225 9/1988 Ulery .......... 439/620

4,954,794 9/1990 Neiman et al. .......... 439/620

*Primary Examiner*—A. D. Pellinen

*Assistant Examiner*—Ronald W. Leja

*Attorney, Agent, or Firm*—Bacon & Thomas

[57] ABSTRACT

A transient suppression component includes a lead assembly adapted to permit in-line installation in a connector contact. One lead surrounds the other and is cylindrical for connection to the aperture tines of a connector ground plate. The other lead carries electrical signals between mating portions of the connector contact assembly. A transient suppression component body is connected between the feedthrough lead and the cylindrical ground lead. The feedthrough lead can be made from a single stamped piece of metal formed to include a component mounting section which substantially encloses the component.

37 Claims, 11 Drawing Sheets

20
21
22
23
24
25
26
27
28
31
32
33
34
35
36
Z
F
J

TRANSIENT SUPPRESSION COMPONENT

This application is a continuation-in-part of U.S. patent application Ser. No. 07/709,152, filed Jun. 3, 1991.

BACKGROUND OF THE INVENTION

1. Field of the Invention

This invention relates to a transient suppression component, and in particular to a transient suppression component for use in an electrical connector.

2. Description of Related Art

It has previously been proposed to place diodes and other nuclear electromagnetic pulse (EMP) or transient voltage suppression (TVS) electrical components on electrical contacts for the purpose of facilitating their use in miniature electrical connectors. Examples are shown in U.S. Pat. Nos. 4,741,710, 4,746,310, and 4,747,789. Present technology, exemplified by the connectors shown in these patents, requires that the component be mounted on the contact by the connector assembler rather than by the component manufacturer, which generally requires notching or recessing the contact in order to accommodate the component. The notching process is difficult and tends to degrade both the mechanical and the electrical properties of the contact. In addition, the retrofitting process required to adapt standard contacts for carrying an electrical component is inherently inefficient.

Prior to insertion of the contact into the connector, the assembler must handle the component, complete the attachement of the component to the contact, and perform screen testing on the contact assembly which is over and above the screening performed by the component manufacturer. Such redundant testing is inefficient, as is the need to handle the component by both the manufacturer of the component and the connector assembler.

Assembly of the EMP or TVS component to the contact would best be handled by the manufacturer of the component, using state-of-the-art component electrode-to-metal joining technology not generally required in connector assembly plants. At present, however, this is not possible because conventional TVS connector designs provide only for retrofitting of the component onto the contact. In other words, at present it is necessary to first provide a contact designed and manufactured for a particular application, and then to add the electronic component.

In addition, present connector applications do not permit the use of higher power diodes because the center-to-center spacing of contacts in such connectors limits the use of conventional leaded diodes. Conventional leaded diode chips are mounted so that the surfaces of the silicon chip are perpendicular to the leads. Consequently, when higher power diodes are needed, the silicon diameter becomes larger than the contact spacing.

SUMMARY OF THE INVENTION

In order to solve the above mentioned disadvantages of prior EMP or TVS contact structures, it is an objective of the invention to provide a TVS component package which is directly useable by the connector manufacturer in a connector without the need for initial assembly of the TVS component to the contact structure.

It is a further objective of the invention to provide a TVS component manufactured using sophisticated state-of-the-art technology generally employed by the semiconductor industry, and yet which may be assembled into the connector by relatively simple connector assembly techniques, the component package leads being adapted to mate with contact structures provided in the connector.

It is a still further objective of the invention to provide a discrete electrical component such as a diode adapted for use in an electrical connector and which can be replaced for purposes of repair or circuit enhancement without removing the connector from the application.

It is yet another objective of the invention to permit the use of higher power diodes in connector applications by mounting the silicon chip transversely in respect to the longitudinal axis of the diode leads so that the surface of the diode is parallel with the leads, enabling use of rectangular diodes and increasing the surface area of the diode by increasing the length of the diode which permits a greater power capability to be achieved without affecting the contact center-to-center spacing.

Finally, it is also an objective of the invention to provide a discrete electrical component including a unique lead structure, and an electrical connector which includes discrete contact structures adapted to mate with portions of the component lead structure, the component lead structure of the invention replacing conventional notched contact designs and providing improved reliability and ease of manufacture.

These objectives are achieved by providing a lead structure for an electrical component in which one lead, attached to either the component anode or cathode, has both an input and an output, and in which a second lead is provided which forms a ground sleeve adapted to directly contact a connector ground plate. The component package is sealed using epoxy or a hermetic glass seal and is ready for assembly into the connector. A single component design can therefore be provided which is ready for assembly into a variety of connectors, without further processing necessary prior to assembly into the connector.

In an especially advantageous embodiment of the invention, a first lead of the transient suppression component includes a stamped sheet of conductive material, which is formed to include a pair of end sections and a component mounting section. The component mounting section includes a base portion and a pair of side portions which surround the component body on three sides such that the component body is placed inside the first lead without the need for notching as would have been the case if the component were mounted directly on a conventional contact, and thus providing increased rigidity and an increased cross-sectional area. Preferably, in this embodiment, the second lead of the component surrounds the first lead, although it may be axially spaced from the component mounting area, and includes an extension which either directly contacts the component, if the component is large enough, or includes a downwardly extending U-shaped portion, one arm of which is electrically connected to an electrode of the component and the other arm of which contacts the second lead extension. Insulation between the second lead and the first lead is provided by a molded insulator which surrounds the component and a second lead mounting section of the first lead, the second arm of the U-shaped portion of the second lead being exposed after molding to permit electrical connection to the second lead extension or transitional portion.

DETAILED DESCRIPTION OF THE PREFERRED EMBODIMENTS

Figures 1, 2, 3, 4:
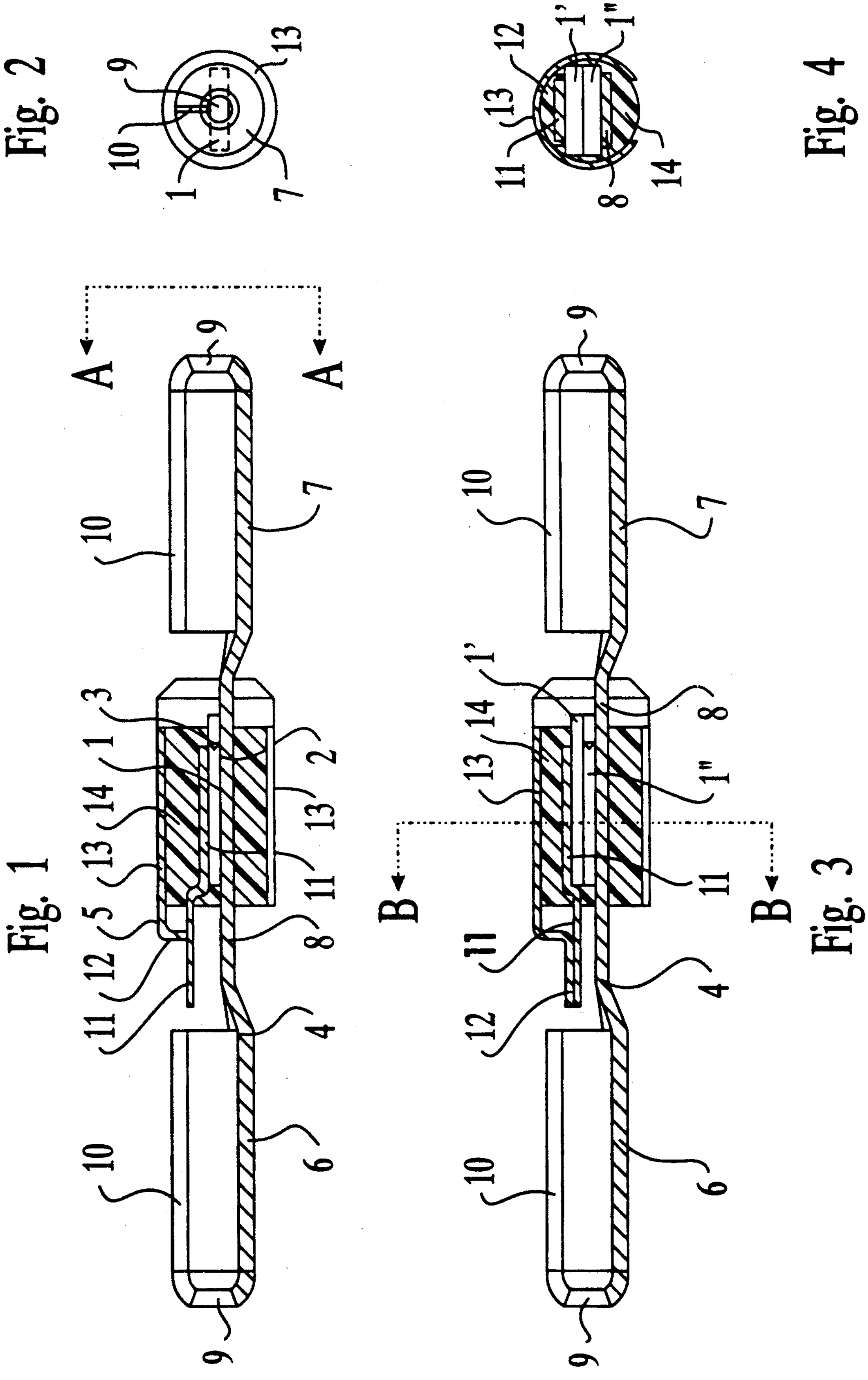
FIG. 1 is a cross-sectional side view of a transient suppression component package according to a first preferred embodiment of the invention.
FIG. 2 is an elevated end view taken from the perspective of line A—A in FIG. 1.
FIG. 3 is a cross-sectional side view showing a variation of the component package of FIG. 1.
FIG. 4 is a cross-sectional end view taken along line B—B in FIG. 3.

FIG. 1 is a cross-sectional side view of a transient suppression component package according to a first preferred embodiment of the invention, and FIG. 2 is an end elevation showing the component package of FIG. 1. The illustrated package includes a component body 1 in the form of a diode body and two electrodes 2 and 3, one of which may form a cathode and the other an anode if the diode is a unipolar diode, or both of which may be cathodes if the diode is bipolar. The preferred diode assembly also includes two unique component leads 4 and 5. It will of course be appreciated by those skilled in the art that component elements other than diode bodies may advantageously be used with the unique leads of the invention.

For example, component body 1 may also take the form of a varistor body, and in particular a multi-layer varistor (MLV). It will be appreciated by those skilled in the art that the lead structures described below may be modified to accommodate a wide variety of materials and manufacturing techniques, and that all such modifications are intended to be including within the scope of the invention.

Lead 4 includes a first end section 6, a second end section 7, and a main section 8. The three sections are preferably formed from a single stamped piece of a conductive material such as copper. In general, copper is too soft for use as a connector contact, but for purposes in which the material is not subjected to too great a mechanical or thermal stress, copper is preferred because of its greater compatibility with the material of the diode electrodes.

Electrode 2 of diode body 1 is directly connected to main section 8 of lead 4, which forms a flat surface to facilitate attachment of the lead to the diode. The two end sections 6 and 7 may, according to the first preferred embodiment of the invention, be folded to form cylindrical termination sections, including apertures 9, which add rigidity of the lead and permit easy "plug in"

electrical connection of the lead to a variety of corresponding mating contact structures. The folding of the end sections to form a cylinder results in a gap 10, which may optionally be closed by welding or other means. Lead 4 provides a feedthrough path for carrying electrical signals from one mating contact structure to another, while at the same time providing an input path to electrode 2 of diode body 1.

On the other hand, the second lead 5 provides a single electrical path in the form of a conductive sleeve in order to electrically connect the diode to the ground plate of an electrical connector. This lead includes three portions: a lead portion 11 connected to electrode 3, an extension 12, and a cylindrical sleeve 13 surrounding the intermediate section 8 of lead 4.

Main section 8 of lead 4, diode body 1 and at least part of lead portion 11 of lead 5 are surrounded by a dielectric insulator in the form of an encapsulant 14 which holds each of the components in place and permits handling of the assembly, while sleeve 13 is arranged to surround insulator 14. For example, dielectric 14 may be in the form of a molded cylinder around which ground sleeve 13 is placed after molding. Alternatively, the diode body and leads may be hermetically sealed by a variety of known methods. Extension 12 of lead 5 is preferably stamped from the same sheet as conductive sleeve 13 and may be soldered to lead portion 11 to complete the package. In the case of a plastic encapsulant, portion 11 is preferaby copper, but portions 12 and 13 may be made of a harder conductive material such as beryllium copper. On the other hand, if hermetic sealing of the component body 1 is used, the lead material should be an alloy able to withstand the higher temperatures involved, and which is nevertheless compatible with the diode body electrode metallization. An example of such a material is kovar, but numerous other suitable alloys may be substituted. Finally, as shown in FIG. 2, the diode body itself is preferably centered in respect to a principal axis of the package when the package is completed.

The variation of the first preferred embodiment shown in FIGS. 3 and 4 is identical to that of FIG. 1, except that a second diode body in series with the first diode body has been added for the purpose of doubling power handling capacity. In an especially advantageous embodiment, the second component is a microwave diode or rectifier silicon material having the property of low capacitance. The addition of a relatively low capacitance component in series with diode body 1 decreases the total capacitance of the shunt circuit because the total capacitance is the reciprocal of the sum of the reciprocals of the individual capacitances of the components. As a result, distortion of signals carried by lead 4 may be significantly reduced.

Because the diode chip or chips are mounted transversely in respect to principal longitudinal axes of the diode leads so that the principal surfaces of the diode are parallel to those of the leads, the diode bodies or chips may be either square or rectangular. The latter configuration permits the surface area of the diode to be increased by increasing the length of the diodes, thereby increasing power handling capability without affecting contact center-to-center spacing in connector applications.

Figure 5:
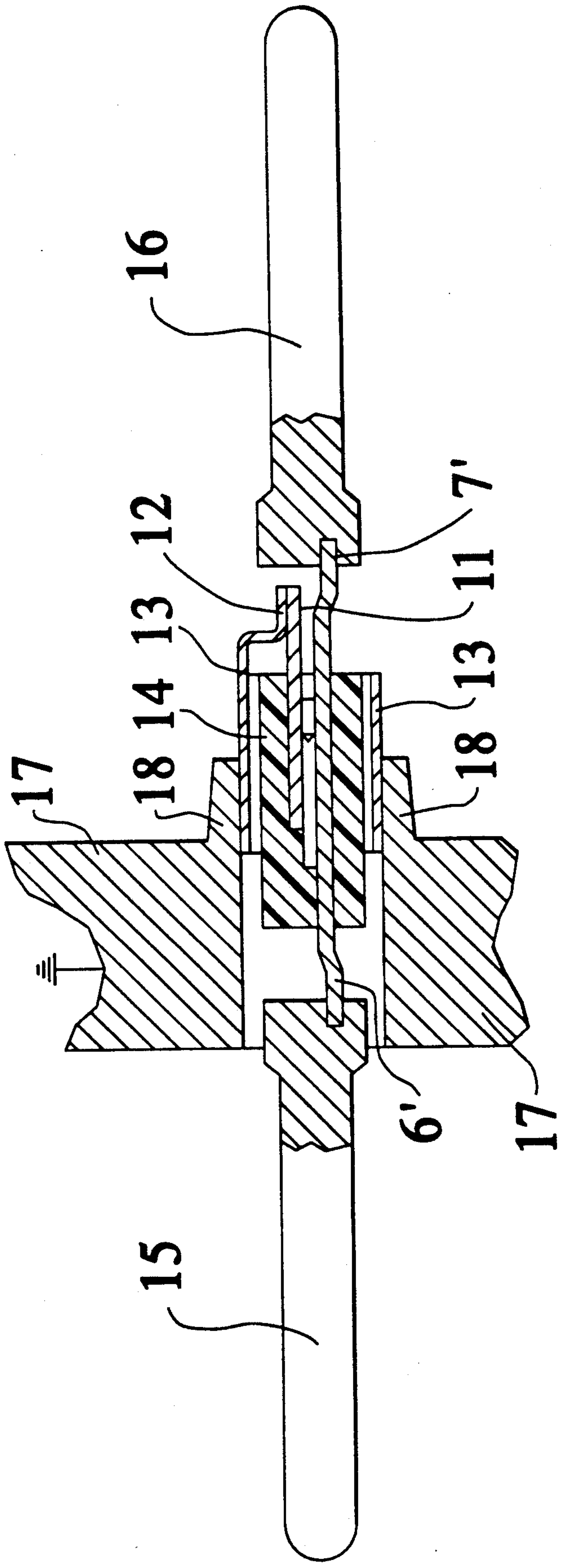
FIG. 5 is a side view of a TVS component package and connector contact assembly according to a second preferred embodiment of the invention.
Figures 6, 7, 8, 9, 10, 11:
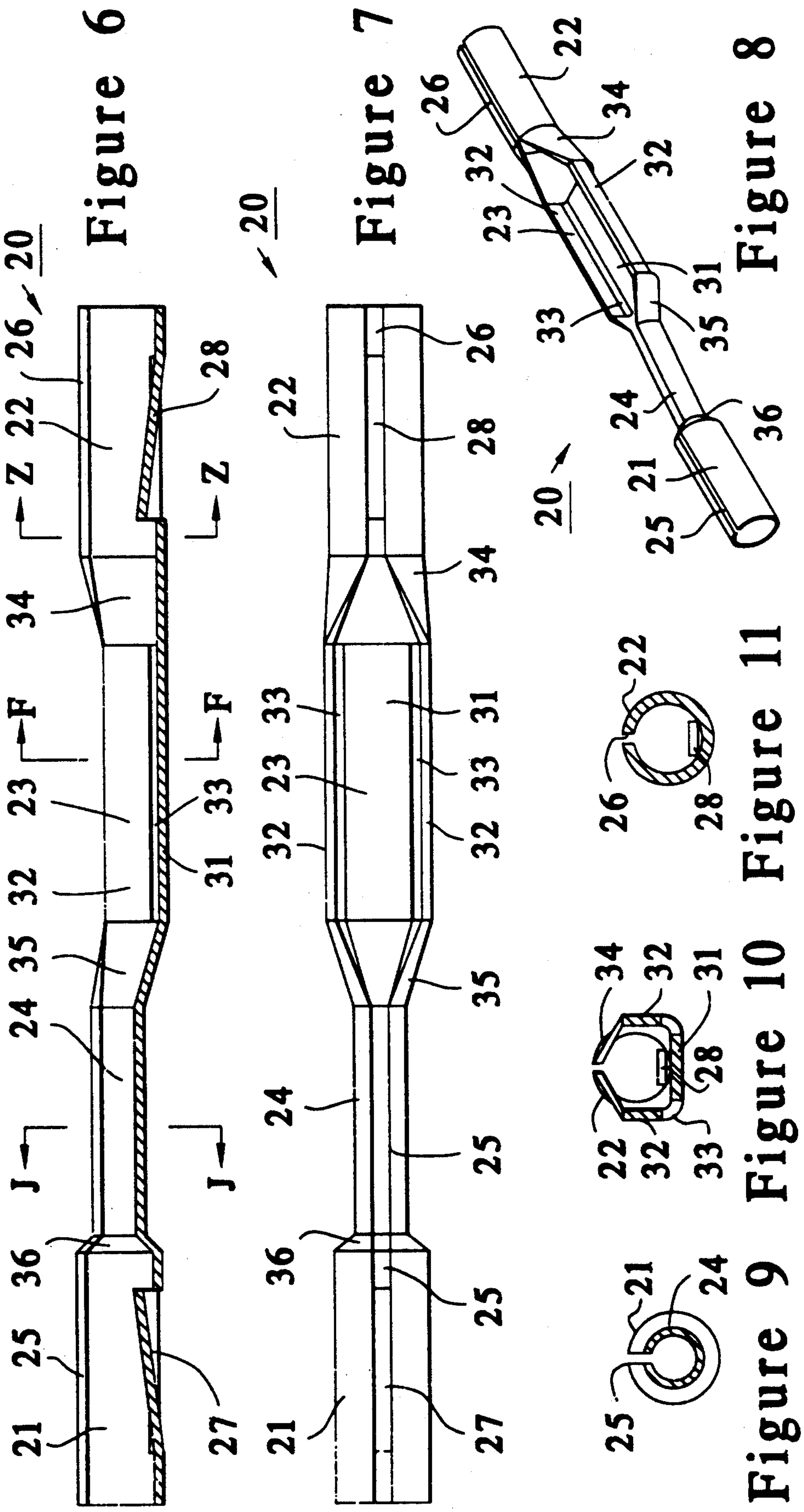
FIG. 6 is a cross-sectional side view of a transient suppression component feedthrough lead structure according to a second preferred embodiment of the invention.
FIG. 7 is an elevated top view of the feedthrough lead structure of FIG. 6.
FIG. 8 is a perspective view of the feedthrough lead structure of FIG. 6.
FIG. 9 is a cross-sectional end view of a mid-section of the preferred feedthrough lead structure of FIG. 6, taken along line J—J.
FIG. 10 is a cross-sectional end view of a component mounting section of the preferred feedthrough lead structure of FIG. 6, taken along line F—F.
FIG. 11 is a cross-sectional end view of a second end section of the preferred feedthrough lead structure of FIG. 6, taken along line Z—Z.

An example of the manner in which a diode constructed according to the principles of the invention may be used in a connector or similar electrical device is shown in FIG. 5, which also shows another variation of the first preferred embodiment of the inventive component lead structure. The connector includes a ground plate 17, which is electrically connected to the shell of a connector of the type shown in FIG. 34, described below in connection with a second preferred embodiment of the invention but also adaptable for use with this embodiment. As disclosed in U.S. Pat. No. 4,747,789, for example, the ground plate may include resilient tines 18 extending from an aperture in the plate through which the component package passes. The tines engage lead 5 when the diode assembly is inserted into the connector.

Prior to insertion into the connector, the first diode lead 4 is attached to a pair of contact mating sections 15 and 16 made of a suitable conductive material such as brass. In this variation of the first embodiment, the end sections 6' and 7' of the lead take the form of pin shaped sections inserted and soldered or glued into bores in contact sections 15 and 16. Alternatively, end sections 6 and 7 or 6' and 7' may themselves be used as contact mating sections for corresponding connector contacts. Contact mating sections 15 and 16 may in general take any form necessary to permit mating of the connector to a corresponding second connector.

A variety of inserts are available for mechanically supporting contact sections 15 and 16 within the connector body. A significant advantage of the preferred arrangements as described above is that the diode itself essentially floats within the connector and is mechanically isolated from the contact pins. This permits discrete replacement of termination contacts 15 and 16 without the necessity of having to replace the diode itself.

Alternatively, the diode packages or units can be arranged to be removed from the connector in the manner disclosed in U.S. Pat. Nos. 4,746,310 and 4,789,360. In other words, the component package permits replacement or substitution of individual components within the connector, while at the same time protecting the individual components and permitting a contact termination section to be replaced if damaged without necessitating replacement of the component itself.

In accordance with a second preferred embodiment of the invention shown in FIGS. 6–11, which utilizes the same basic principles as the first preferred embodiment and its variations, but which provides a lead structure having improved performance and reliability, a first lead 20 includes a first end section 21, a second end section 22, a component mounting section 23, and a second lead mounting section 24. The four sections of the first lead are preferably formed from a single stamped piece of a conductive material. Although copper may be used as the conductive material, beryllium copper is preferred for this embodiment because of its greater resistance to mechanical and thermal stress.

Figure 34:
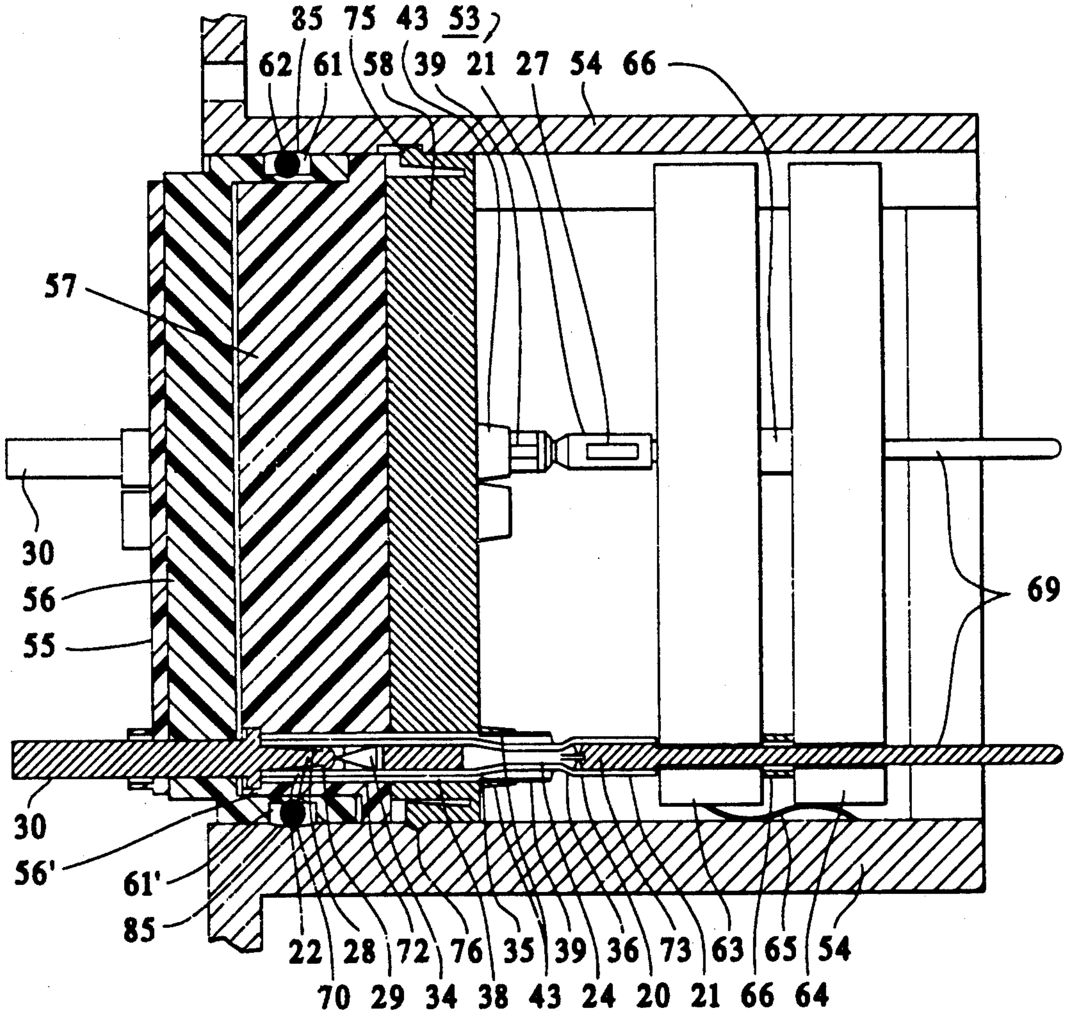
FIG. 34 is a cross-sectional side view of a connector which incorporates the transient suppression component package of FIGS. 6–17.

First and second end sections 21 and 22 form sockets for facilitating connection with the contacts of an electrical connector as shown in FIG. 34, described in more detail below, or directly with corresponding pin contacts of external connectors (not shown) designed to be mated with a connector of the type illustrated in FIG. 34. Gaps 25 and 26, caused when the stamped metal blank is formed into cylindrical end portions, permit the sockets to expand when a contact pin is inserted, such that the restoring force resulting from the resilience of the metal causes the socket to grip the connector contact pin and provide a good electrical connection therewith. In addition, end sections 21 and 22 preferably include tines 26 and 27, which extend into the sockets to engage shoulders 29 provided on the connector contact pin 30 to which the socket is connected, as shown in FIG. 34, and which thereby removably secures the contact pin 30 to the lead structure 20.

The component mounting section 23 of FIGS. 6–11 includes a base portion 31, and two side portions 32. Portions 31 and 32 together form a chamber which surrounds the component, the portions serving to both protect the component and provide rigidity for the lead structure. In this arrangement, the component may be thought of as being, in effect, mounted on the inside surface of the lead—as opposed to, for example, within a notch on the exterior surface of a connector contact. This provides an increased cross-section for a feedthrough current and thereby reduces the effects of increased impedance inherent in a notched contact, while at the same time increases structural integrity. In order to permit outflow of molding material during insulation of the component, as described below, and to facilitate the lead forming process, cut-outs 33 may respectively be provided between sections 31 and 32. Cut-outs 33 assist in cleaning solder fluxes and/or other contaminations formed during die attachment. They also facilitate placement of rectangular bodies in the mounting section, the corners of the rectangular bodies being able to extend into the cut-outs without the need to provide sharp corners between portions 31 and 32.

Because of the different cross-sections of component mounting section 23 and end section 22, a first transition section 34 is provided between sections 22 and 23. Similarly, second transition section 35 is formed between component mounting section 23 and second lead mounting section 24, and a third transition section 36 is provided between second mounting section 24 and end section 21. In order to facilitate manufacture of the lead structure, blend radii may be provided as necessary between the various sections and transition sections.

Figure 12:
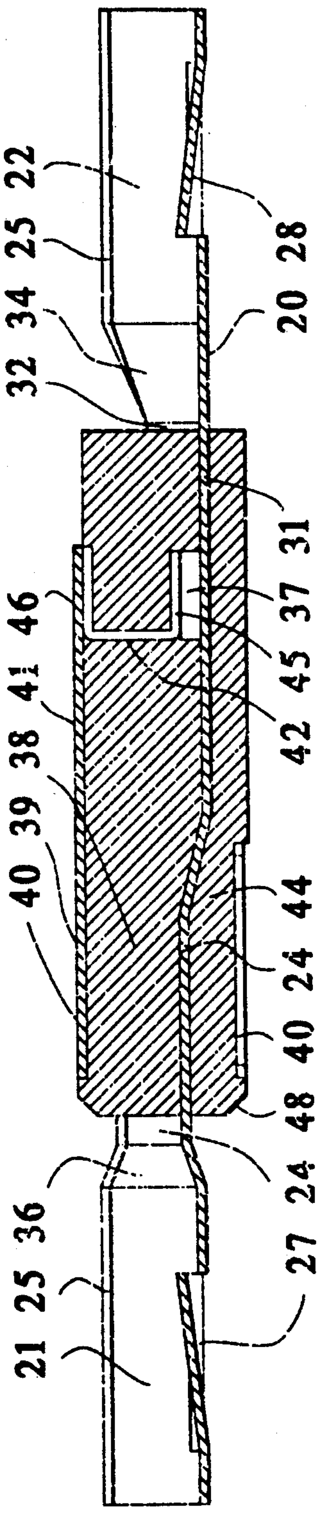
FIG. 12 is a cross-sectional side view of a transient suppression component package which includes the feedthrough lead structure of FIG. 6, a transient suppression component, and a second component lead.
Figure 13:
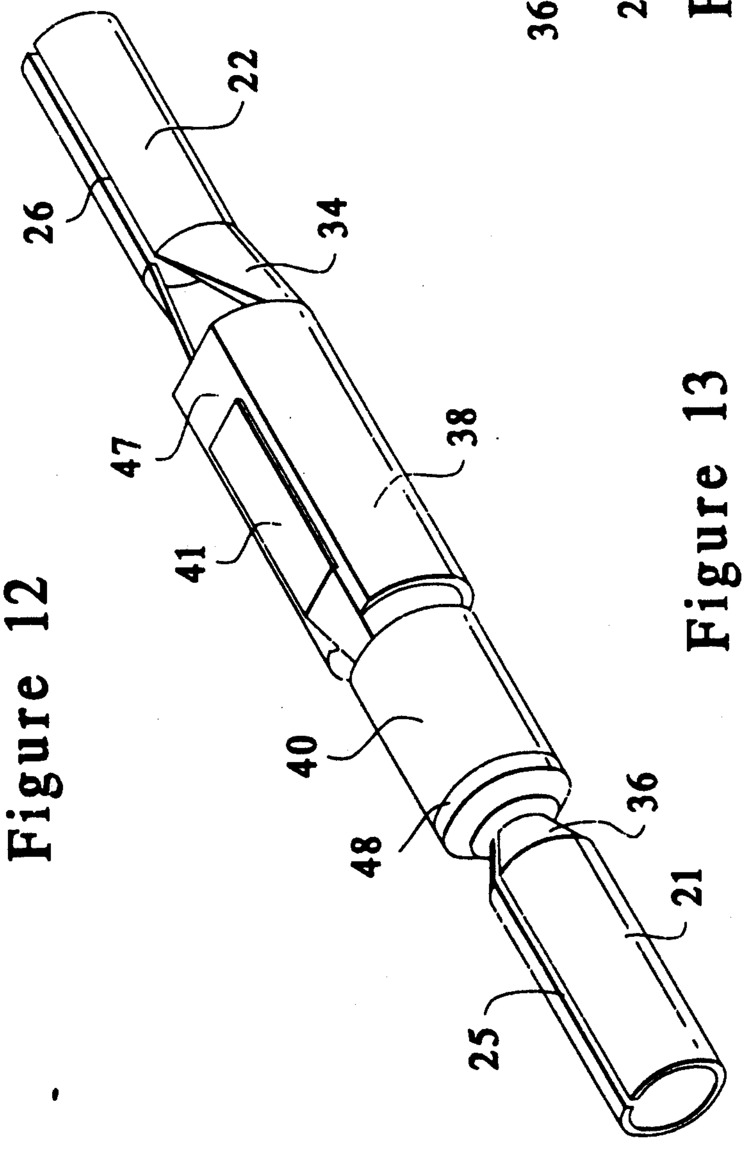
FIG. 13 is a perspective view of the component package of FIG. 12.

As shown in FIGS. 12 and 13, the completed component package of this second preferred embodiment of the invention includes first lead 20 which serves as a feedthrough lead, a transient suppression diode body 37 similar to diode body 1, a molded insulator body 38, and a second lead 39 which includes a cylindrical lead portion 40, a transitional lead portion 41, and a downwardly extending portion 42. Cylindrical portion 40 extends substantially completely around section 24 of first lead 20, and is designed to engage the conventional ground plate spring tines 43 in the connector shown in FIG. 34. Transitional portion 41 extends from cylindrical portion 40, is preferably integral therewith, and extends over molded insulator 38. Portion 42, on the other hand, is preferably a discrete member and is molded into insulator 38 after electrical connection to an anode or cathode of diode body 37 in order to electrically connect the diode body and transitional portion 41. The opposite electrode of diode body 37 is electrically connected directly to first lead 20. both electrical connections may be effected by conventional methods, in a manner similar to that described above in connection with diode body 1. Accordingly, diode body 37 may also be formed from two or more series-connected diode bodies to increase power handling capabilities as described above.

Figure 14:
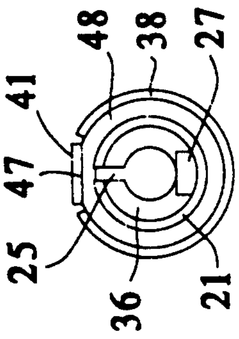
FIG. 14 is an elevated end view of the component package of FIG. 12.
Figure 15:
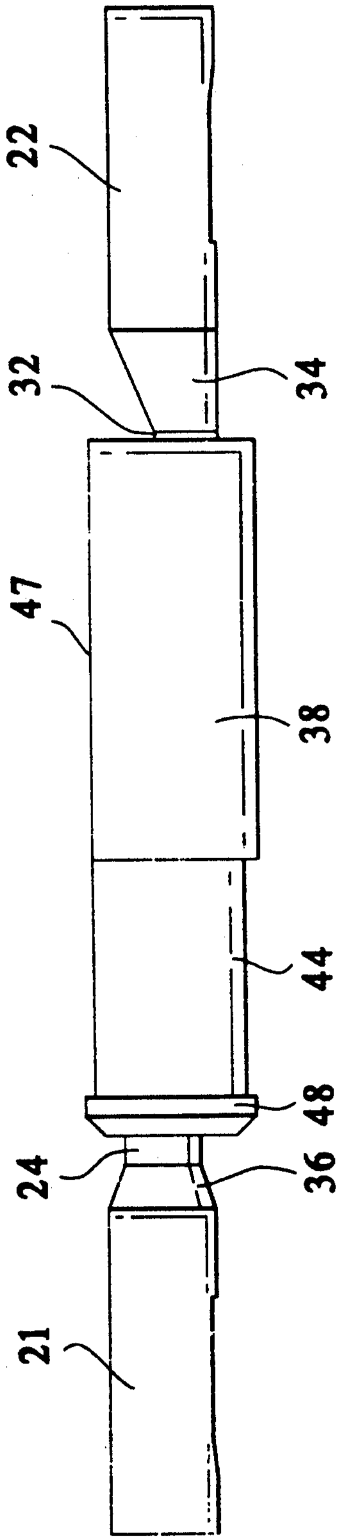
FIG. 15 is an elevated side view of the component package of FIG. 12, before attachment of the second component lead.
Figure 16:
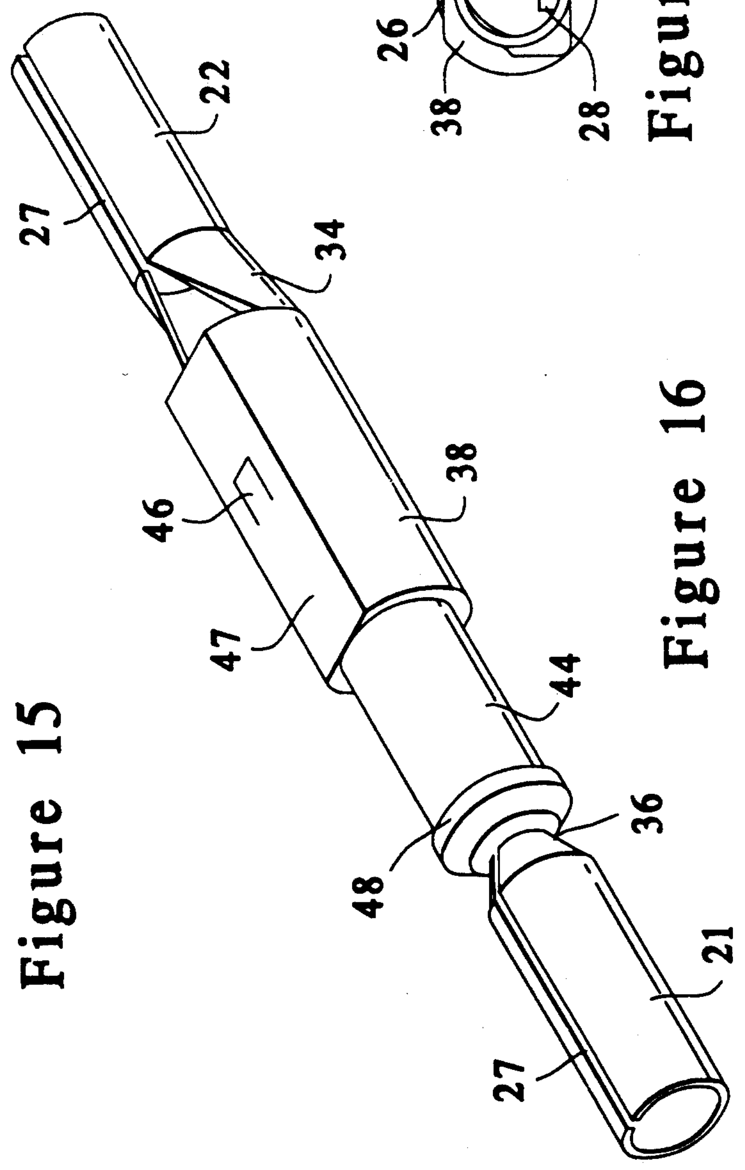
FIG. 16 is a perspective view of the partially assembled component package of FIG. 15.
Figure 17:
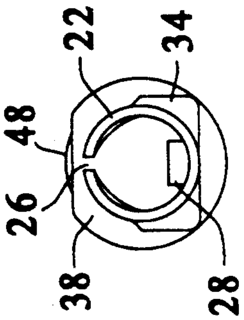
FIG. 17 is an elevated end view of the partially assembled component package of FIG. 15.
Figure 18:
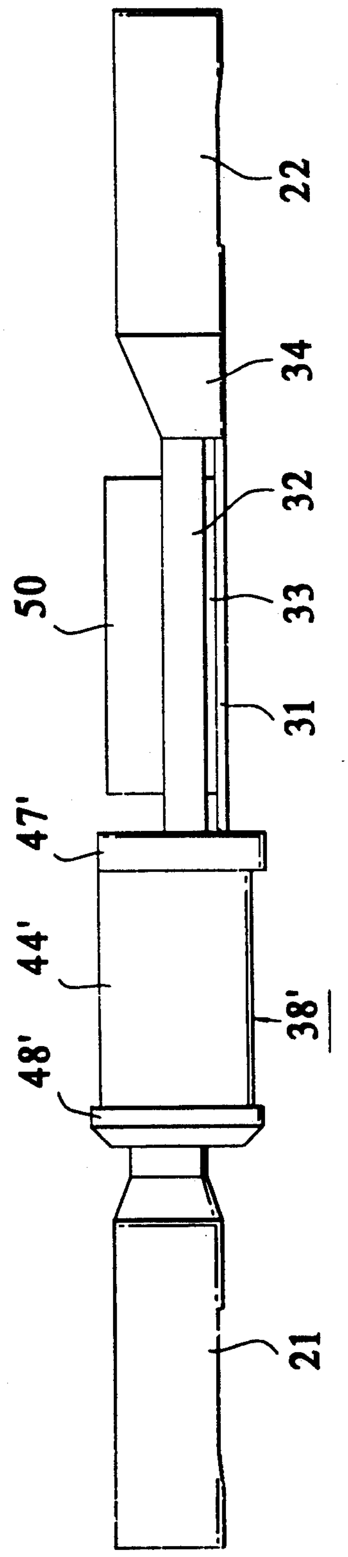
FIG. 18 is an elevated side view of a variation of the component package of FIG. 15, with the second component lead removed and including a multilayered varistor.
Figure 19:
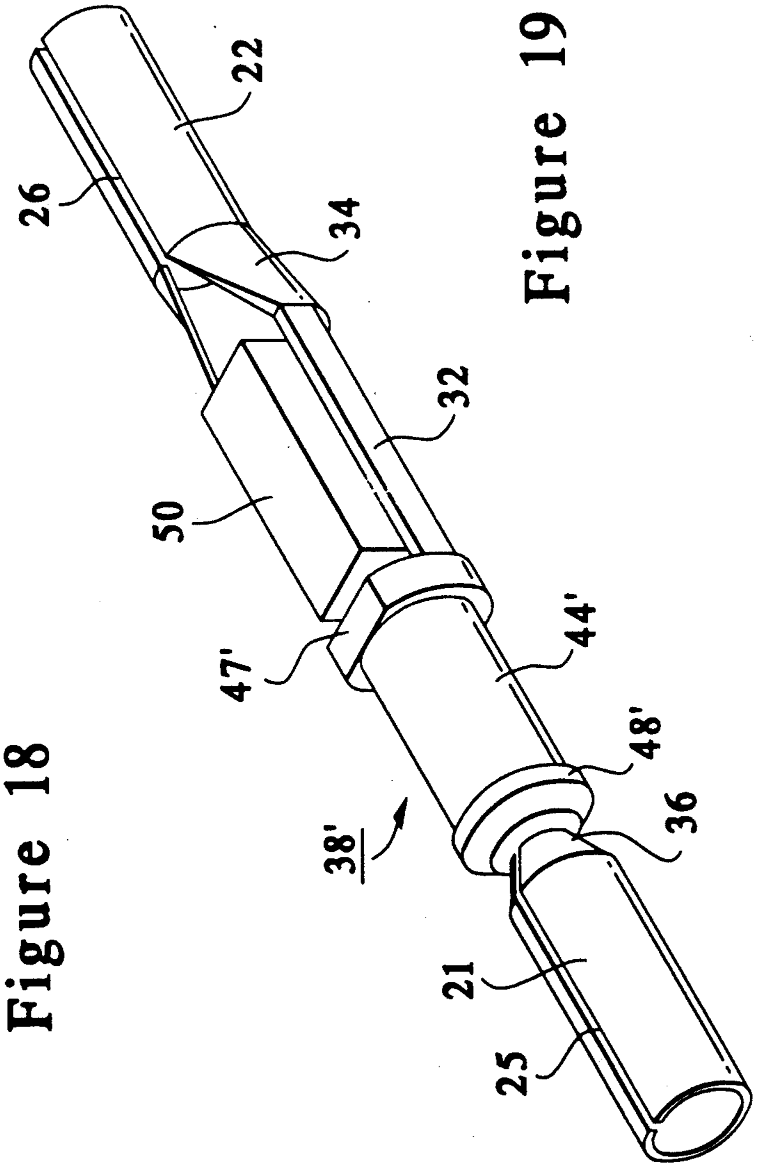
FIG. 19 is a perspective view of the partially assembled component package of FIG. 18.
Figure 20:
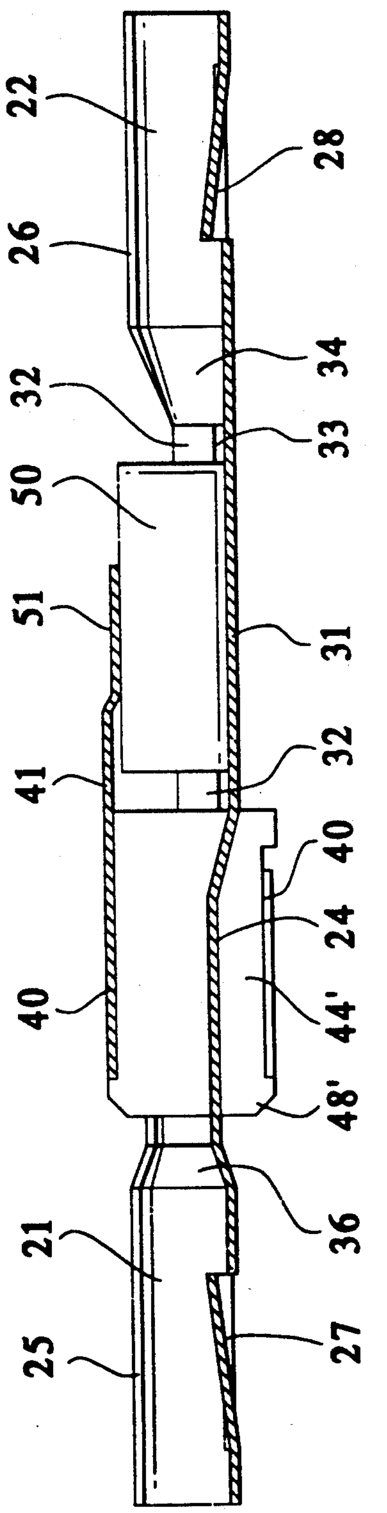
FIG. 20 is a cross-sectional side view of a transient suppression component package including a second component lead and the MLV of FIG. 18.
Figure 21:
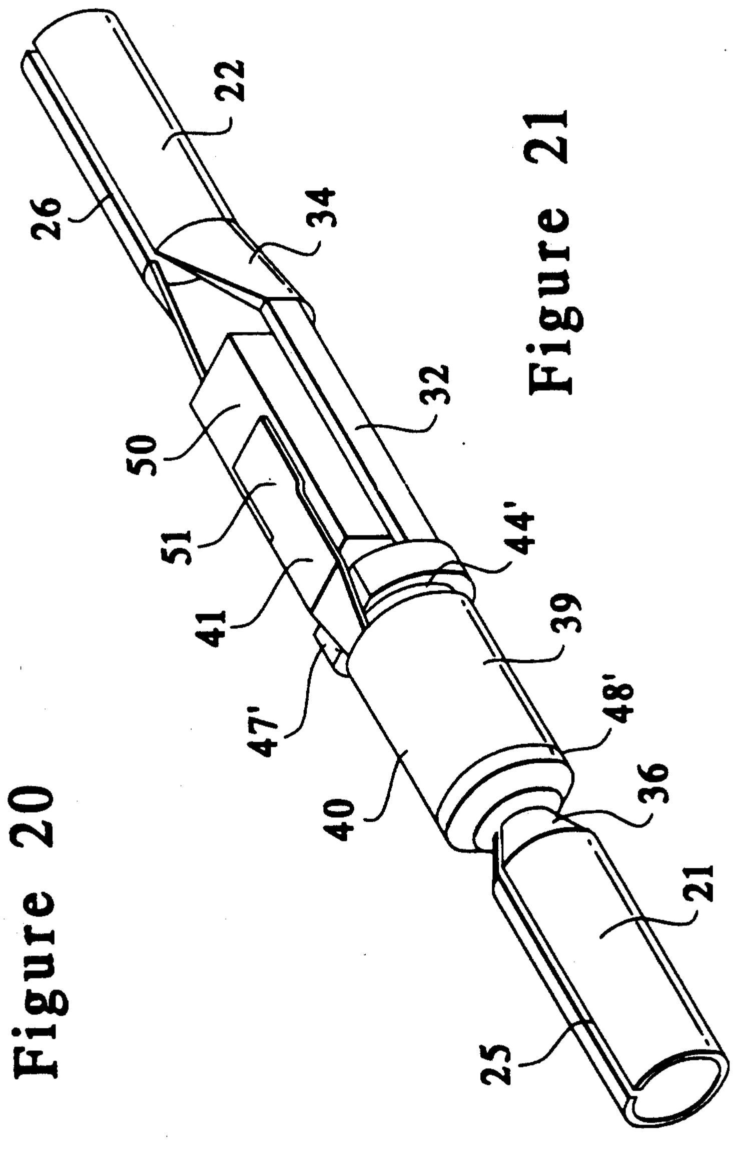
FIG. 21 is a perspective view of the component package of FIG. 20.
Figures 22, 23, 24, 25, 26, 27:
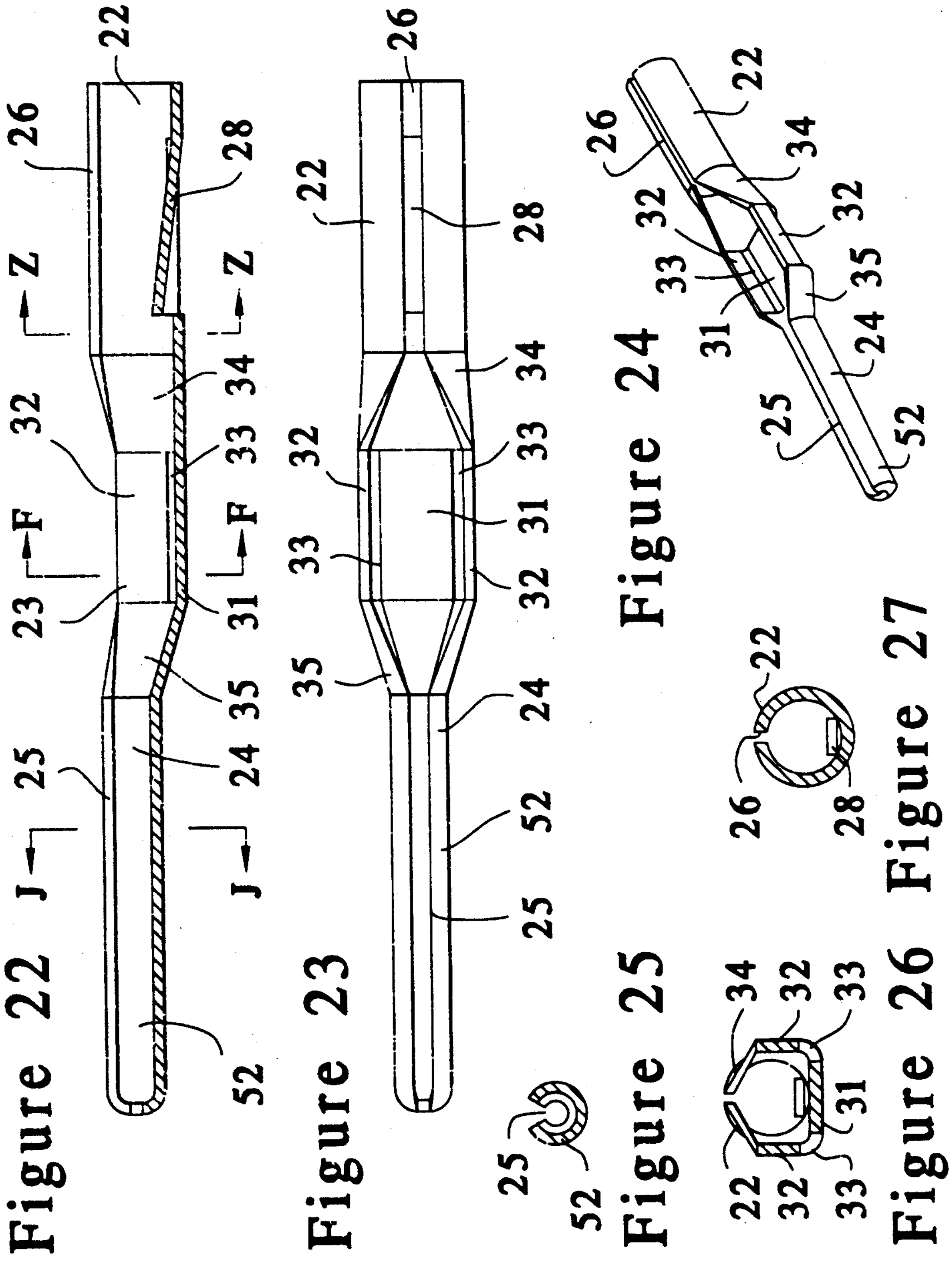
FIG. 22 is a cross-sectional side view of a variation of the transient suppression component feedthrough lead structure of FIG. 6.
FIG. 23 is an elevated top view of the feedthrough lead structure of FIG. 22.
FIG. 24 is a perspective view of the feedthrough lead structure of FIG. 22.
FIG. 25 is a cross-sectional end view of a second lead mounting section of the preferred feedthrough lead structure of FIG. 22, taken along line J—J.
FIG. 26 is a cross-sectional end view of a component mounting section of the preferred feedthrough lead structure of FIG. 22, taken along line F—F.
FIG. 27 is a cross-sectional end view of an end section of the preferred feedthrough lead structure of FIG. 22, taken along line Z—Z.
Figure 28:
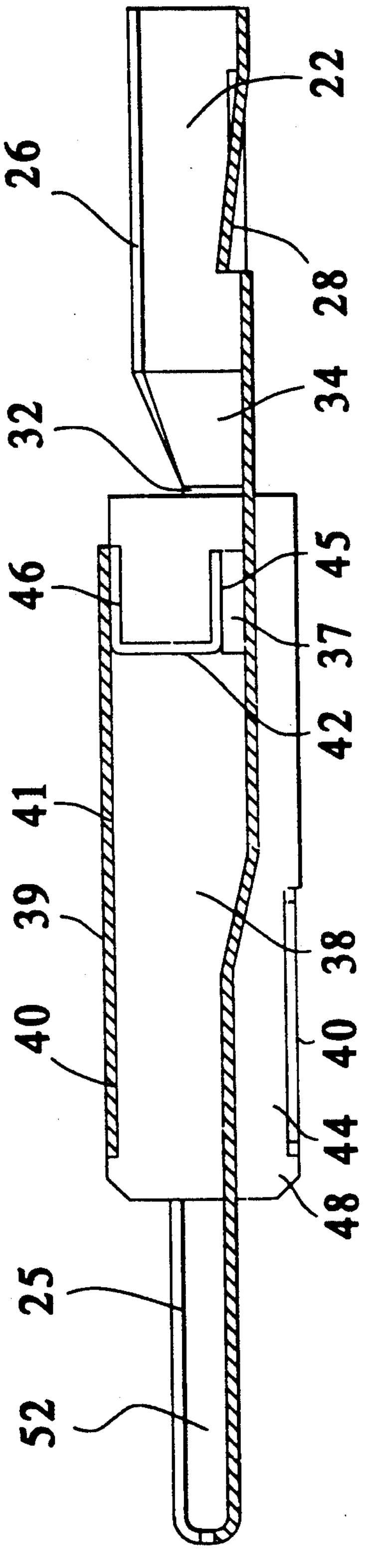
FIG. 28 is a cross-sectional side view of a transient suppression component package which includes the feedthrough lead structure of FIG. 22, a transient suppression component, and a second component lead.
Figure 30:
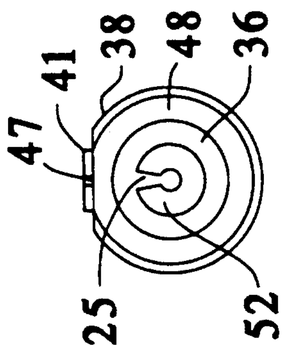
FIG. 30 is an elevated end view of the component package of FIG. 28.
Figure 29:
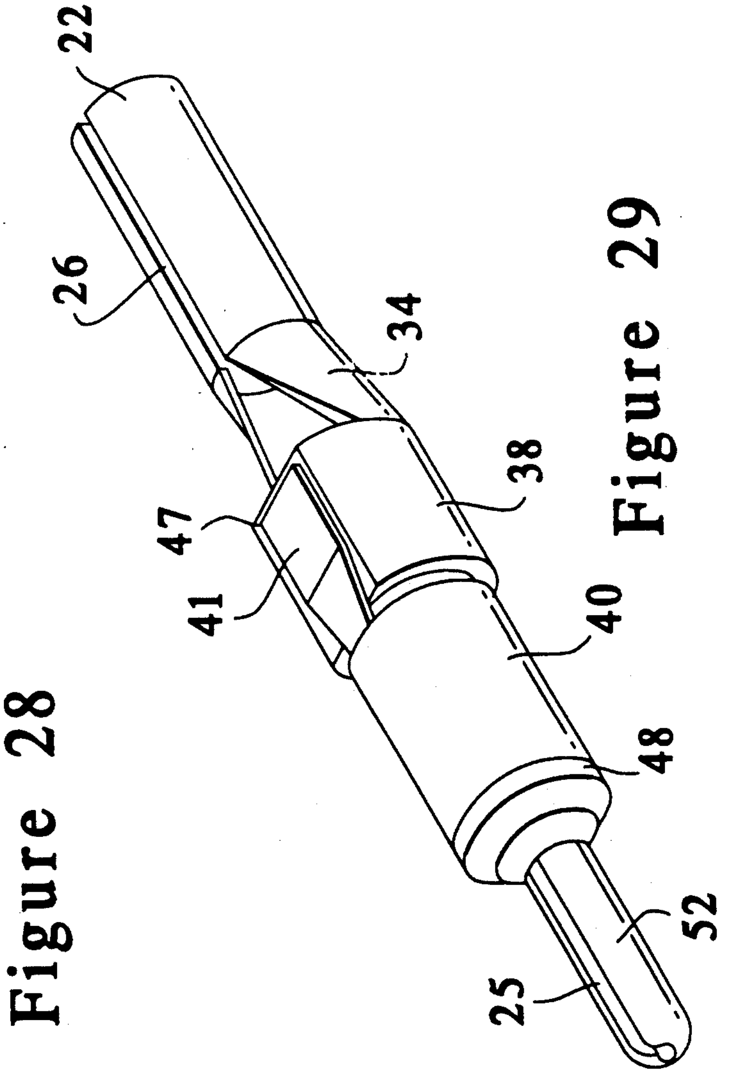
FIG. 29 is a perspective view of the component package of FIG. 28.
Figure 31:
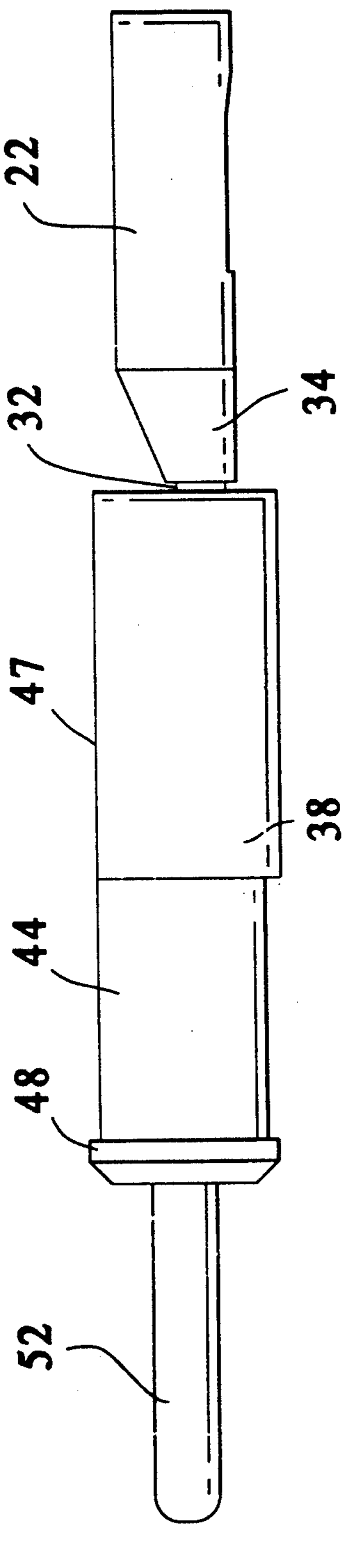
FIG. 31 is an elevated side view of the component package of FIG. 28, before attachment of the second component lead.
Figure 32:
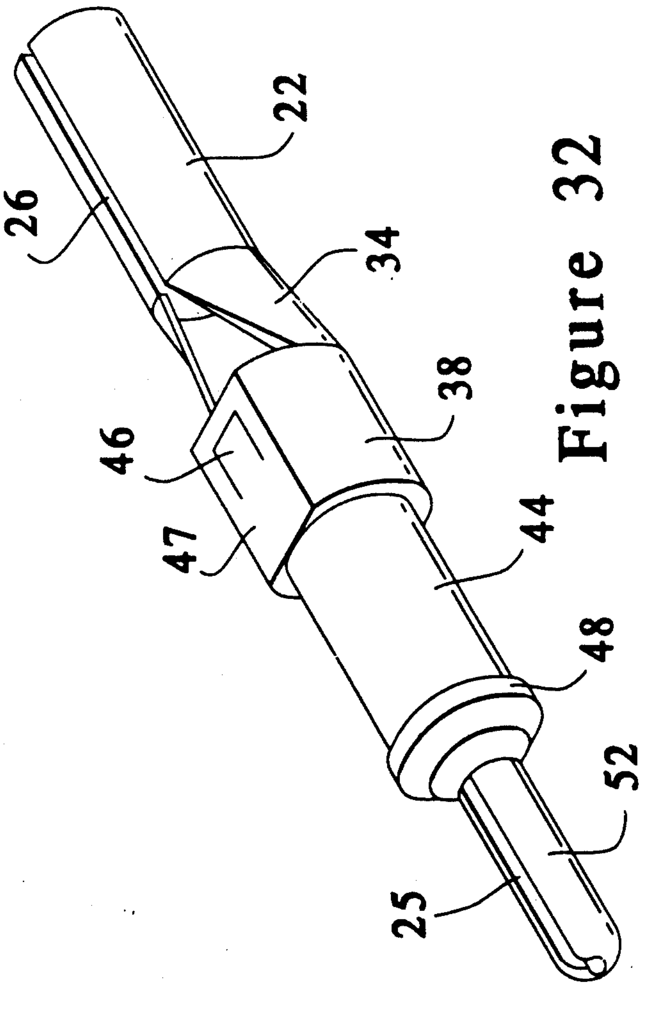
FIG. 32 is a perspective view of the partially assembled component package of FIG. 31.
Figure 33:
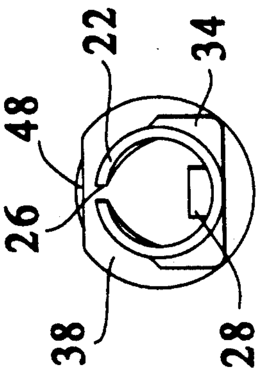
FIG. 33 is an elevated end view of the partially assembled component package of FIG. 31.

As shown in FIGS. 15–17, which illustrates the package of FIGS. 12–14 with the ground sleeve 40 removed, insulator 38 may be made of any dielectric material and is molded into place after connection of diode body 37 with portion 42 of lead 39 and with mounting portion 23 of lead 20. A reduced diameter portion 44 is provided to accommodate cylindrical portion 40 of lead 32. Portion 42 is generally U-shaped and includes an arm 45 connected to the first electrode of diode body 37, and an arm 46 which is exposed, as shown in FIG. 16, after the insulator 38 has been molded. Insulator 38 may also be molded with a flat portion 47 and collar 48 to accommodate transitional portion 41 of lead 39, which is placed on flat 47 after molding and electrically connected to arm 46 of U-shaped portion 42 by conventional electrical connection methods such as soldering, thus completing the diode package.

In the variation of the second embodiment shown in FIGS. 18–21, the electrical transient suppression component is a multi-layered varistor (MLV) 50 rather than a diode. Because of the larger volume of the MLV, it is not necessary to provide a downwardly extending portion on the second lead. Instead, transitional portion 41 may be directly connected to an electrode of MLV 50, via a bent portion 51 if necessary. With the exception of the above modification of lead 39 and provision of a modified insulator 38', which includes a collar 48', a reduced diameter portion 44', and a truncated flattened portion 47', the MLV package of this variation is essentially identical to the diode package of the first variation. Insulator 38' is truncated to accommodate MLV 50, which is not molded into the insulator.

In a further variation of the transient suppression component package of the second preferred embodiment, insulator 38 or 38' and/or the cylindrical portion 40 of lead 39 may take the form of a snap-on sleeve of the type disclosed in U.S. patent application Ser. No. 07/698,131, filed May 10, 1991, the disclosure of which is hereby incorporated by reference. In addition, as with the first embodiment of the invention, hermetic sealing of diode body 37 or MLV body 50 may be provided instead of or in addition to the molded insulator.

The final variation of the second preferred embodiment disclosed herein, as illustrated in FIGS. 22–33, is identical in all respects to the variation shown in FIGS. 6–17, except that instead of providing a socket end section 21, feedthrough lead mounting section 24 is extended to form a pin-type termination section 52 for termination to a socket type contact structure rather than to a pin type contact structure. It will of course be appreciated by those skilled in the art that numerous other termination section configurations may also be used, depending on the requirements of the device in which the component package is to be used. The advantages of the inventive component package are not limited to the context of connectors, and the scope of the invention is likewise not intended to be limited thereto. Nevertheless, the inventive package is in fact especially advantageous for use in a connector as described below.

FIG. 34 illustrates an electrical connector 53 in which the transient suppression component packages of the preferred embodiments may be used. Connector 53 includes a shell 54, dielectric contact holding inserts 55, 56, and 57, and a molded and conductively plated ground plate structure 58 including integrally molded spring tines 43 and resilient ground contact portions 75 and 76 for retaining and positioning the ground plate in shell 54 and establishing electrical contact between the shell. Insulator 56 includes a groove 61 for retaining an O-ring seal 62 similar to that disclosed in copending application Ser. No. 07/848,337, filed on Mar. 9, 1992, the seal also serving to removably retain insert 56 in the connector shell. A portion of groove 61, designated by reference numeral 61', is formed by a member 56' which is attached to insert 56 after molding. Indent 85 is provided in the connector shell to receive O-ring 62 upon insertion of insert 56 into the connector.

In the illustrated embodiment of connector 53, a pi filter formed by capacitor plates 63 and 64, grounded to the shell via plate spring 65, and inductor elements 66 is also included, although the inclusion of pi filters is of course optional.

Contacts 30 and 69 are uniquely designed to permit removal and replacement of the component package and the separate contacts 30 and 69 either separately, or together as a modular unit. To this end, socket contact 30 includes a reduced diameter portion 70 tapered to end in a shoulder 29 on a head portion 72 which engages an inside surface of the end section 22 to establish electrical contact therewith. As socket contact 30 is assembled to lead 20 by inserting head portion 72 into section 22, tine 28 flexes outwardly to permit the head to pass, and then snaps inwardly to lock the head within section 22. In order to replace the component package, it is simply necessary to remove inserts 55 and 56, permitting socket contact 30 to be withdrawn, the engagement between tine 28 and shoulder 29 causing the package to be removed along with the contact, at which time it can be disassembled from the contact for separate replacement of either part. Pin contact 69 can be secured via tine 27 by modifying an engagement portion 73, or it can be made separately removable, as shown, from the rear of the contact upon removal of filter capacitors 63 and 64.

As described herein, therefore, the invention provides a SGEMP, EMP, or TVS component package in which one of the leads is adapted to be connected to connector contact mating portions having a variety of different configurations, and the other lead is adapted to engage the resilient tines located in apertures of a conventional connector ground plate for easy insertion into and removal from the connector. A single component package, including the unique lead configurations of the preferred embodiments, may be manufactured in bulk by the component manufacturer using state-of-the-art component manufacturing techniques, and assembled to any desired contact mating portion configuration using relatively simple metal-to-metal joining techniques. After the leads are assembled to the component and the component is tested, no further testing or special handling of the individual component body is required.

Having described in detail specific embodiments of an improved component package and a contact assembly using the improved component package, it is nevertheless anticipated that numerous variations of the preferred embodiments will occur to those skilled in the art, for example, use of the inventive lead structures with electrical components other than diodes or MLVs, and uses in contexts other than the illustrated electrical connector, and therefore it is intended that the invention be limitedly solely by the appended claims.

We claim:

1. An electrical component package, comprising:

a first lead having a first end section adapted to mate with a first electrical contact, a second end section adapted to mate with a second electrical contact, and a component mounting section;

a component mounted on said mounting section; and a second lead electrically connected to said component, said second lead substantially surrounding said first lead, and separated from said first lead by an electrical insulator wherein said first lead is formed from a single sheet of stamped and formed conductive material, and wherein said mounting section comprises a base portion and two side portions, the base portion and side portions together forming a chamber which substantially surrounds the component to thereby protect the component and increase rigidity of the first lead.

2. A package as claimed in claim 1, wherein said base portion is a flat component mounting surface.

3. A package as claimed in claim 1, wherein said base portion and side portions are separated from each other by cut-outs in said stamped and formed conductive material.

4. A package as claimed in claim 1, wherein said first lead further comprises a second lead mounting section for mounting said second lead at a position axially spaced from said component mounting section.

5. A package as claimed in claim 4, wherein said second lead comprises a substantially cylindrical portion from which extends a transitional portion, a distal end of which is electrically connected to an electrode of said component.

6. A package as claimed in claim 5, wherein said component is a diode, and said second lead further comprises a downwardly extending portion electrically connecting said transitional portion with said electrode.

7. A package as claimed in claim 6, wherein said downwardly extending portion has a U-shape and is surrounded by said insulator except that one leg of the downwardly extending portion is exposed after molding to contact said transitional portion.

8. A package as claimed in claim 5, further comprising a molded insulator member for insulating said second lead from said first lead.

9. A package as claimed in claim 5, wherein said component is a varistor, and said distal end directly contacts an electrode of said varistor.

10. A connector as claimed in claim 9, wherein said varistor is a multi-layered varistor.

11. A package as claimed in claim 1, further comprising a molded insulator for insulating said second lead from said first lead.

12. A package as claimed in claim 1, wherein said component is a diode.

13. A package as claimed in claim 1, wherein said component is a multi-layered varistor.

14. A package as claimed in claim 1, wherein one of said first and second end sections includes an inwardly extending tine arranged to engage a shoulder on a contact to permit withdrawal of the contact together with the package from a connector, and to permit disconnection between the package and the contact after withdrawal so that either the package or the contact may be replaced as needed.

15. A package as claimed in claim 1, wherein said first end section is in the form of a cylinder.

16. A package as claimed in claim 1, further comprising a molded insulating material surrounding said mounting section, said body, and a first portion of said second lead, and wherein a cylindrical portion of said second lead substantially surrounds said insulating material and is electrically connected via an extension of said cylindrical portion to said first portion of said second lead.

17. A package as claimed in claim 16, wherein said first portion is U-shaped and said extension is electrically connected to a leg of said U which is exposed after molding.

18. A package as claimed in claim 1, wherein said second lead includes a cylindrical portion.

19. A package as claimed in claim 1, wherein said component includes a first electrode which contacts said mounting section of said first lead, and a second electrode which contacts said mounting section of said second lead.

20. A connector contact assembly including two contacts and an in-line transient suppression package, said package including a component, a first lead having a first end section electrically connected to a first of said contacts, a second end section electrically connected to a second of said contacts, and a component mounting section electrically connected to an electrode of said component, and said package further including a second lead electrically connected to a second electrode of said component and which includes a cylindrical portion adapted to engage resilient tines extending from a ground plate in the connector, wherein said mounting section comprises a base portion and two side portion, the base portion and side portions together forming a chamber which substantially surrounds the component to thereby protect the component and increase rigidity of the first lead.

21. An assembly as claimed in claim 20, wherein said first lead is formed from a single sheet of stamped and formed metallic material.

22. An assembly as claimed in claim 20, wherein said mounting section includes a flat component body mounting surface.

23. An assembly as claimed in claim 20, further comprising a molded dielectric material encapsulating said component, said component mounting section, and a first portion of said second lead, and wherein said cylindrical portion of said second lead substantially surrounds a portion of said dielectric material and is electrically connected via an extension to said first portion of said second lead.

24. An assembly as claimed in claim 20, wherein said component is a diode.

25. An assembly as claimed in claim 20, wherein said component is a multi-layer varistor.

26. An assembly as claimed in claim 20, wherein said component includes a first electrode which contacts and is electrically connected to said mounting section of said first lead, and a second electrode electrically connected to said second lead.

27. An assembly as claimed in claim 20, wherein said first end section comprises means including an inwardly extending resilient tine for engaging a shoulder provided on said first contact to thereby latch said package and said contact together such that removal of said contact from said connector causes said package to also be removed, after which said package may be separated from said contact.

28. An electrical component comprising two leads and an electrical component body, said component body being electrically connected between and attached to the two leads, wherein one of two leads includes a component mounting section on which the component body is mounted and a second of said two leads substantially surrounds the first of said two leads at a point axially spaced from the component mounting section, and wherein said first lead includes a chamber which at least partially surrounds said component on at least five sides.

29. A component as claimed in claim 28, wherein the first of said two leads has two ends and is adapted to carry an electrical signal from one end to the other.

30. A component as claimed in claim 29, wherein said component is a diode.

31. A component as claimed in claim 29, wherein said component is a varistor.

32. A component as claimed in claim 29, wherein the second lead includes a cylindrical portion.

33. An electrical component comprising two leads and an electrical component body, said component body being electrically connected between and attached to two leads, wherein one of the two leads includes a component mounting section on which the component body is mounted and a second of said two leads substantially surrounds the first of said two leads and at least a portion of said component mounting section, and wherein said first lead includes a chamber which at least partially surrounds said component on at least five sides.

34. A component as claimed in claim 33, wherein the first of said two leads has two ends and is adapted to carry an electrical signal from one end to the other.

35. A component as claimed in claim 34, wherein said component is a diode.

36. A component as claimed in claim 34, wherein said component is a varistor.

37. A component as claimed in claim 34, wherein the second lead includes a cylindrical portion.

* * * * *